(12) United States Patent
Nakagawa

(10) Patent No.: US 7,599,120 B2
(45) Date of Patent: Oct. 6, 2009

(54) COMPOSITE LENS, MANUFACTURING METHOD FOR COMPOSITE LENS, AND LENS MODULE

(75) Inventor: Youhei Nakagawa, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 693 days.

(21) Appl. No.: 11/217,305

(22) Filed: Sep. 2, 2005

(65) Prior Publication Data

US 2006/0050399 A1    Mar. 9, 2006

(30) Foreign Application Priority Data

Sep. 7, 2004    (JP)    ............... 2004-259924

(51) Int. Cl.
  *G02B 3/00*    (2006.01)
  *G02C 7/02*    (2006.01)
  *B29D 11/00*   (2006.01)

(52) U.S. Cl. .................. 359/642; 351/166; 359/796; 264/1.7

(58) Field of Classification Search ................ 351/166; 359/642, 796; 264/1.7
See application file for complete search history.

(56) References Cited

U.S. PATENT DOCUMENTS 5,067,800 A    11/1991    Shirakawa
5,531,940 A *  7/1996    Gupta et al. ............. 264/1.7

FOREIGN PATENT DOCUMENTS

| JP | 60-072927 A  | 4/1985  |
|----|--------------|---------|
| JP | 1-171932     | 7/1989  |
| JP | 01-198312 A  | 8/1989  |
| JP | 3-13902      | 1/1991  |
| JP | 08-001807 A  | 1/1996  |
| JP | 08-103916 A  | 4/1996  |
| JP | 09-248861 A  | 9/1997  |
| JP | 2722623      | 11/1997 |
| JP | 10-058550 A  | 3/1998  |
| JP | 3111677      | 9/2000  |
| JP | 2004-126511 A| 4/2004  |

OTHER PUBLICATIONS

Japanese Office Action dated May 19, 2009 issued in corresponding Japanese patent Application No. 2004-259924.

* cited by examiner

*Primary Examiner*—Scott J Sugarman
(74) *Attorney, Agent, or Firm*—Westerman, Hattori, Daniels & Adrian, LLP.

(57) ABSTRACT

A composite lens of the present invention has a resin layer made from a resin to be polymerized by ultraviolet rays provided on at least a part of a surface of a glass base material, the resin layer including a completely cured resin layer and an incompletely cured resin layer. The incompletely cured resin layer may be formed outside a lens effective diameter. Preferably, the incompletely cured resin layer has a polymerization degree of 60 to 90%.

12 Claims, 5 Drawing Sheets

(a)

(b)

(c)

COMPOSITE LENS, MANUFACTURING METHOD FOR COMPOSITE LENS, AND LENS MODULE

The priority application Number 2004-259924 upon which this patent application is based is hereby incorporated by reference.

BACKGROUND OF THE INVENTION

1. Field of the Invention

The present invention relates to a composite lens such as an aspherical lens, a fresnel lens, an achromatic lens, a diffraction grating, etc., having an active energy ray-curing resin adhesively formed on a surface of a glass base material, a manufacturing method for the composite lens, and a lens module including the composite lens.

2. Description of Related Art

In recent years, a technique for adhesively forming an active energy ray-curing resin on a surface of a glass base material has been developed and utilized as a manufacturing method for an aspherical lens and the like (see JP 1-171932 A and JP 3-13902 A). However, in the case of formation of a resin on a glass base material surface, there has been a problem that residual stress inside the resin layer due to shrinkage during curing of the resin separates the resin layer from the glass base material or produces cracks in the resin layer in a completed product because of a temperature change in usage atmosphere.

Accordingly, there have been a method of curing a resin in two separate stages, and a method of first curing only a center portion of a resin using a mask and last curing the whole resin (see JP 2722623 B, and JP 3111677 B). However, the above methods have a problem that a production cost becomes higher due to increased processes.

SUMMARY OF THE INVENTION

An object of the present invention is to provide a composite lens having improved reliability such as heat cycle characteristics and capable of being manufactured at a low cost, a manufacturing method for the composite lens, and a lens module including the composite lens.

A composite lens of a first invention is a composite lens having a resin layer made from a resin to be polymerized by ultraviolet rays provided on at least a part of a surface of a glass base material, the resin layer including a completely cured resin layer and an incompletely cured resin layer. The incompletely cured resin layer may be formed outside a lens effective diameter. Preferably, the incompletely cured resin layer has a polymerization degree of 60 to 90%. The resin may vary in refractive index or in transmittance of visible light depending on the polymerization degree.

The resin layer may be formed from an organic-inorganic complex. The organic-inorganic complex may be formed from an organic polymer and a metal alkoxide. The organic-inorganic complex may also be formed from at least one metal alkoxide. In this case, the organic-inorganic complex is preferably formed from at least two metal alkoxides.

The refractive index of the organic-inorganic complex to be finally formed can be adjusted by suitably adjusting a combination of an organic polymer and a metal alkoxide, or a combination of at least two metal alkoxides in the organic-inorganic complex.

Usable as the metal alkoxide is a metal alkoxide having a polymerizable group that polymerizes by light. In this case, a metal alkoxide having a polymerizable group that polymerizes by light or heat, and a metal alkoxide lacking the polymerizable group are preferably used in combination. Examples of the polymerizable group include a methacryloxy group, an acryloxy group, and a styryl group. In the case of use of a metal alkoxide having a polymerizable group, the polymerizable group of the metal alkoxide is preferably polymerized by light.

Examples of the metal alkoxide particularly include alkoxides of Si, Ti, Zr, Al, Sn, Zn, etc. Particularly, an alkoxide of Si, Ti, or Zr is preferably used. Therefore, an alkoxysilane, a titanium alkoxide, and a zirconium alkoxide are preferably used, and particularly, an alkoxysilane is preferably used.

Examples of the alkoxysilane include tetraethoxysilane, tetramethoxysilane, tetraethoxysilane, tetra-n-propoxysilane, tetraisopropoxysilane, tetra-n-butoxysilane, tetraisobutoxysilane, phenyltriethoxysilane (PhTES), phenyltrimethoxysilane (PhTMS), etc.

Examples of the alkoxysilane having the polymerizable group include 3-methacryloxypropyltriethoxysilane (MPTES), 3-methacryloxypropyltrimethoxysilane (MPTMS), 3-methacryloxypropylmethyldimethoxysilane, 3-acryloxypropyltrimethoxysilane, p-styryltriethoxysilane, p-styryltrimethoxysilane, etc.

Examples of the titanium alkoxide include titanium isopropoxide, titanium butoxide, etc. Examples of a zirconium alkoxide include zirconium isopropoxide, zirconium butoxide, etc.

Usable as the metal alkoxide are the above examples and, in general, a metal alkoxide represented by the formula $M(OR)_n$, $R'M(OR)_{n-1}$, or $R'2M(OR)_{n-2}$ (wherein M represents a metal; n is 2, 3, 4, or 5; and R and R' represent an organic group). Examples of the organic group include an alkyl group, an aryl group, and an organic group having the above-mentioned polymerizable group. Examples of M include Si, Ti, Zr, Al, Sn, Zn, etc., as described above. An alkyl group with a carbon number of 1-5 is preferable.

In the case of the organic-inorganic complex formed from an organic polymer and a metal alkoxide, the organic polymer is not particularly limited if the organic polymer can form the organic-inorganic complex with the metal alkoxide. The organic polymer may be, for example, a macromolecule polymer having a carbonyl group, a macromolecule polymer having a benzene ring, and a macromolecule polymer having a naphthalene ring.

Specific examples of the organic polymer include, for example, polyvinylpyrrolidone, polycarbonate, polymethylmethacrylate, polyamide, polyimide, polystyrene, polyethylene, polypropylene, epoxy resin, phenol resin, acryl resin, urea resin, melamine resin, etc. In view of forming an organic-inorganic complex excellent in optical transparency, polyvinylpyrrolidone, polycarbonate, polymethylmethacrylate, polystyrene, epoxy resin, and a mixture of these are preferably used as an organic polymer.

Preferably, a photopolymerization initiator is added in the case of curing of the organic-inorganic complex using light (ultraviolet rays). Addition of a photopolymerization initiator allows photocuring by a small irradiation dose of light (ultraviolet rays).

Specific examples of the photopolymerization initiator include, for example, benzylketal, α-hydroxyacetophenone, α-aminoacetophenone, acylphosphine oxide, 1-hydroxy-cyclohexyl-phenyl-ketone, 2-benzyl-2-dimethylamino-1-(4-morpholinophenyl)-butanone-1, trichloromethyltriazine, diphenyliodonium salt, triphenylsulfonium salt, imidesulfonate, etc.

A manufacturing method for a composite lens of a second invention comprises the steps of applying a resin liquid to a glass base material, pressing a mold against the glass base material and the resin liquid, and forming a completely cured resin layer and an incompletely cured resin layer by irradiating ultraviolet rays having an uneven intensity distribution and terminating irradiation of the ultraviolet rays before the resin liquid is completely cured.

A lens module of a third invention uses the composite lens of the first invention as a medium for collecting visible light.

In the composite lens of the first invention, stress due to resin curing can be reduced without reducing adhesiveness between the glass base material and the resin by lowering the polymerization degree of a part of the resin layer, which is completely cured conventionally, and replacing the part with the incompletely cured resin layer. Therefore, separation and cracks caused by external factors such as a heat cycle or a heat shock acting on the composite lens can be avoided.

The incompletely cured resin layer can shrink as time elapses and change the shape. This can change a curvature of the incompletely cured resin layer and degrade optical performance. Therefore, if the incompletely cured resin layer is provided outside the lens effective diameter of the composite lens, optical performance is prevented from degrading even if the curvature changes because the change occurs outside the lens effective diameter.

If the polymerization degree of the incompletely cured resin layer is 60% or less, the resin layer is soft and therefore a surface thereof is fragile. On the other hand, if the polymerization degree is 90% or more, a reduction degree of the stress is low and therefore possibility of occurrence of separation or cracks becomes higher. Therefore, when the polymerization degree of the incompletely cured resin layer is 60 to 90%, occurrence of the above-described problems can be prevented.

When a resin that varies in refractive index depending on the polymerization degree, for example, a resin having a smaller refractive index as the polymerization degree becomes lower is formed on a convex glass base material, unnecessary light among light emitted from the convex surface, which passes outside the lens effective diameter, is difficult to collect because the incompletely cured resin layer outside the lens effective diameter has a smaller refractive index. This can prevent a ghost from happening. In contrast, when a resin having a larger refractive index as the polymerization degree becomes lower is formed on a concave glass base material, unnecessary light among light emitted from the concave surface, which passes outside the lens effective diameter, is difficult to collect because the incompletely cured resin layer outside the lens effective diameter has a larger refractive index. This can prevent a ghost from happening.

Furthermore, when a resin that varies in transmittance depending on the polymerization degree, for example, a resin having a smaller transmittance as the polymerization degree becomes lower is used, unnecessary light, which passes outside the lens effective diameter, can be eliminated because the incompletely cured resin layer outside the lens effective diameter has a smaller transmittance. Usable as a resin in this case is a resin having titanium oxide 20 wt. % mixed with 3-methacryloxypropyltriethoxysilane (MPTES) 5.5 ml, ethanol 20.5 ml, hydrochloric acid (2N) 1.65 ml, and phenyltrimethoxysilane 3.75 ml. Because this resin significantly varies in transmittance depending on the polymerization degree, a transmittance of only a resin layer outside the lens effective diameter can be greatly lowered. Furthermore, occurrence of a ghost can be suppressed when an average transmittance for visible light of the resin layer outside the lens effective diameter is 50% or less of an average transmittance for visible light of the resin layer within the lens effective diameter.

The refractive index of the organic-inorganic complex to be finally formed can be adjusted by suitably adjusting a combination of an organic polymer and a metal alkoxide, or a combination of at least two metal alkoxides in the organic-inorganic complex. In the case of curing of the organic-inorganic complex using light (ultraviolet rays), addition of a photopolymerization initiator allows photocuring by a small irradiation dose of light (ultraviolet rays).

According to the manufacturing method for a composite lens of the second invention, cost reduction is possible because of ultraviolet curing in one stage in place of conventional ultraviolet curing in two stages. Furthermore, cost increase can be avoided because the ultraviolet rays to be irradiated can easily have an intensity distribution. Thus, manufacture of a composite lens at a low cost is possible.

According to the lens module of the third invention, a cost of an optical module itself can also be reduced by providing a composite lens of low cost in the optical module as a collective lens. Furthermore, reliability in a heat cycle or the like can be improved.

DETAILED DESCRIPTION OF THE INVENTION

An embodiment of the present invention will be specifically described below by way of an example, but the present invention is not limited to the example below and can be suitably modified and carried out within a scope of a summary thereof.

First, a solution used in the present example and comparative examples for forming an organic-inorganic complex was prepared in the following manner. An organic-inorganic complex solution was manufactured by mixing 3-methacryloxypropyltriethoxysilane (MPTES) 5.5 ml, ethanol 20.5 ml, hydrochloric acid (2N) 1.65 ml, and phenyltrimethoxysilane 3.75 ml, after leaving the mixture for 72 hours at 24° C. mixing in a photopolymerization initiator of 1-hydroxy-cyclohexyl-phenyl-ketone 1 wt. % in order to accelerate ultraviolet curing, and applying heat for one hour at 100° C. to evaporate ethanol.

Figure 2:
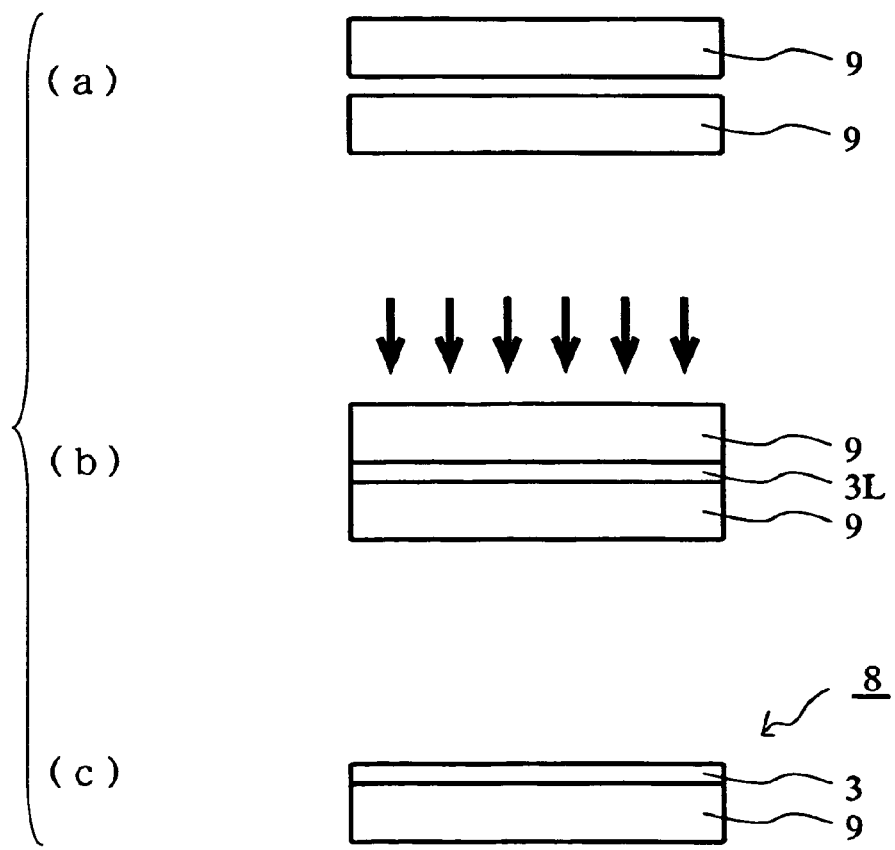
FIG. 2 is a process drawing illustrating a process for manufacturing a flat plate sample.
Figure 3:
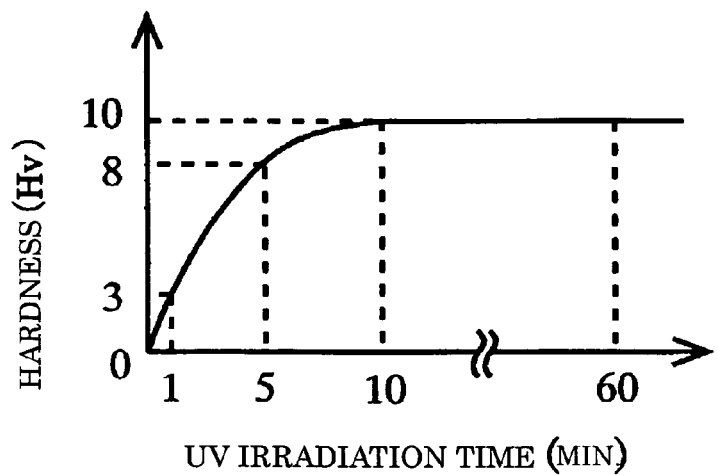
FIG. 3 is a graph showing a relationship between ultraviolet irradiation time and resin hardness.

Next, a relationship is checked between ultraviolet irradiation time and resin hardness. FIG. 2 includes a series of sectional views showing a process described below for manufacturing a flat plate sample 8. Two flat plates 9 (plate thickness approximately 1 mm) made of a commercially available glass material BK-7 were prepared, and as shown in FIG. 2(a), placed as opposed to each other with a distance of 100 μm. As shown in FIG. 2(b), the organic-inorganic complex solution 3L was charged between the flat plates 9, and ultraviolet rays with a central wavelength of approximately 365 nm were uniformly irradiated as indicated by arrows at an intensity of 1 mW/cm². As shown in FIG. 2(c), one flat plate 9 was removed to complete a flat plate sample 8 having a resin layer 3 formed on the other flat plate 9. A plurality of flat plate samples 8 were manufactured with the irradiation time as a parameter (1-60 minutes), and each hardness was measured (100 gf load, 20 seconds holding) using a Vickers hardness tester (made by Akashi Corporation). Hardness and polymerization degree has a relationship in which the higher polymerization degree is, the higher hardness is. FIG. 3 shows a hardness measurement result. FIG. 3 reveals that when the irradiation time reaches ten minutes, the hardness is 10 Hv and held constant, which means complete curing.

EXAMPLE 1

Figure 4:
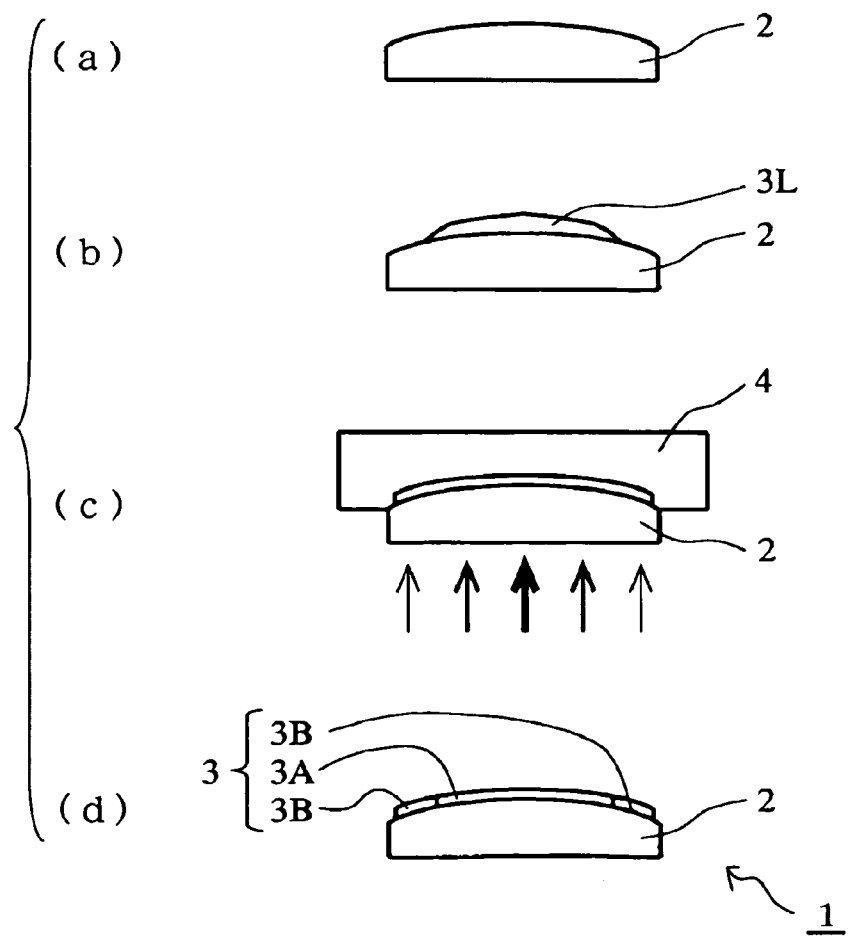
FIG. 4 is a process drawing illustrating a process for manufacturing a composite lens of example 1 of the present invention.
Figure 5:
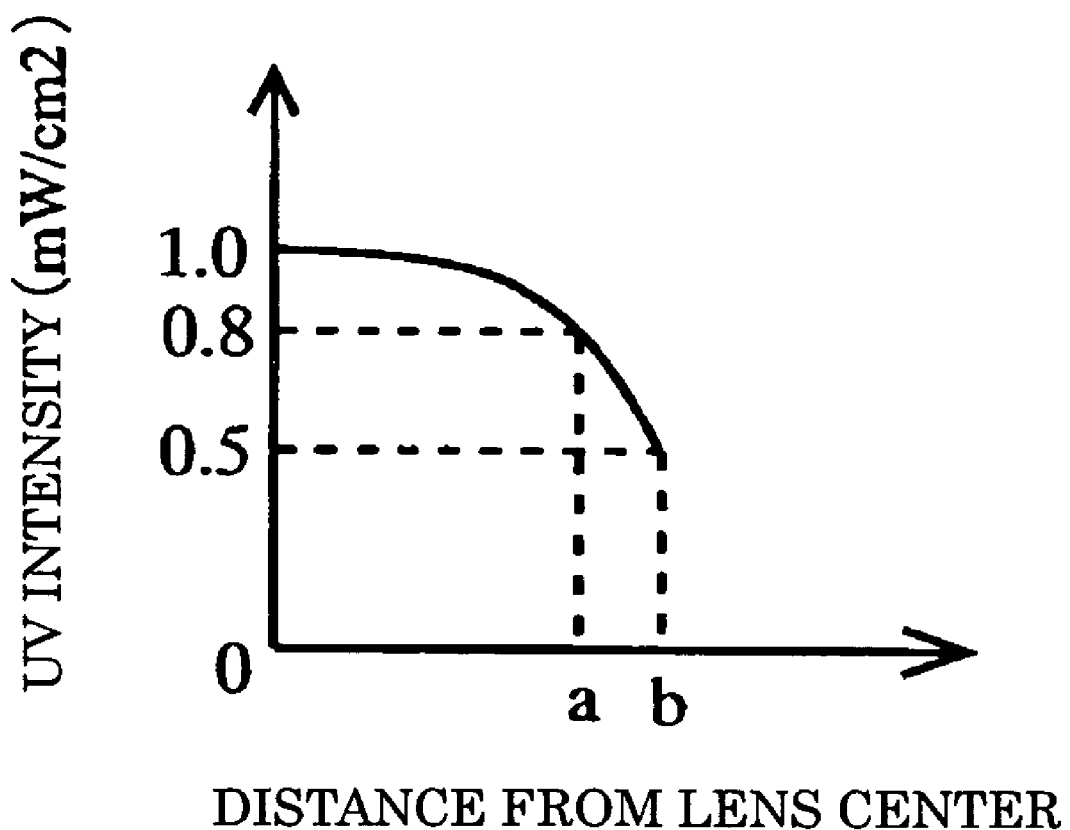
FIG. 5 is a graph showing an intensity distribution of irradiated ultraviolet rays in the manufacturing process of the composite lens of example 1 of the present invention.

FIG. 4 includes a series of sectional views illustrating a process for manufacturing a composite lens of example 1. A commercially available glass material BK-7 was ground to manufacture, as shown in FIG. 4(a), a glass base material 2 in the form of a planoconvex lens with a diameter of 10 mm and F=30 mm. As shown in FIG. 4(b), the organic-inorganic complex solution 3L was applied on the glass base material 2 so as not to contain bubbles. Thereafter, as shown in FIG. 4(c), a mold 4 having a surface nickel-plated was pressed thereto, and ultraviolet rays (indicated by arrows) with a central wavelength of approximately 365 nm having an intensity distribution shown in FIG. 5 were irradiated for ten minutes toward a plane side of the glass base material 2. The organic-inorganic complex solution was thereby cured to form a resin layer. Next, the mold 4 was removed to complete a composite lens 1 shown in FIG. 4(d). The resin layer 3 formed has a thickness of approximately 100 µm.

Figure 1:
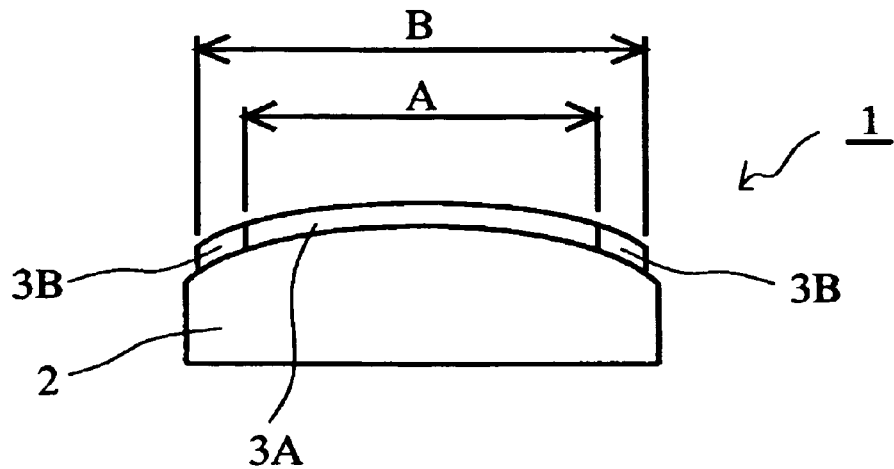
FIG. 1 is a sectional view of a composite lens of the present invention.
Figure 7:
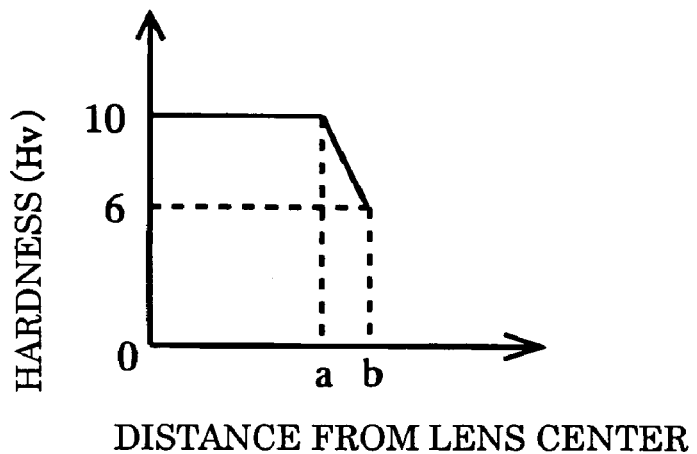
FIG. 7 includes graphs showing a hardness distribution of the present example and comparative examples.
Figure 7:
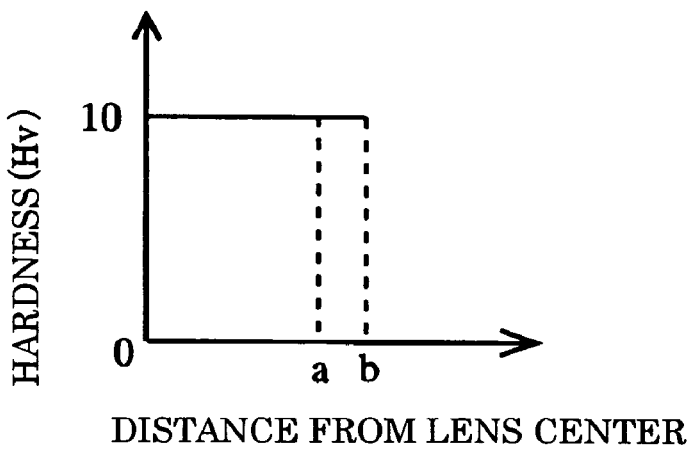
Figure 7:
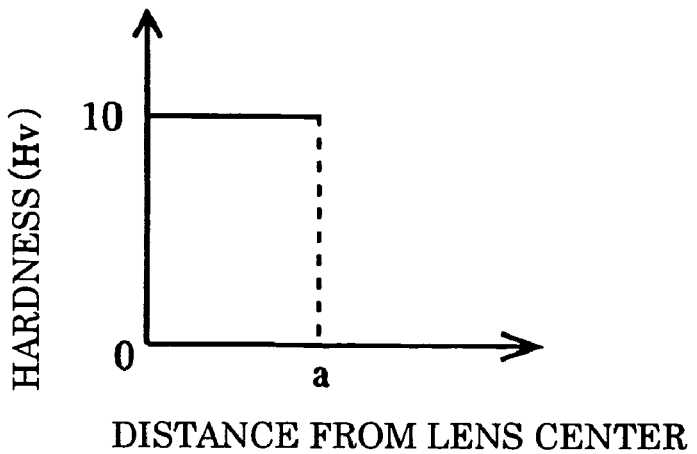

FIG. 1 shows a sectional view of the completed composite lens 1. A indicates a lens effective diameter, and B indicates a resin layer outside diameter. Hardness of the resin layer formed was measured (100 gf load, 20 seconds holding) using a Vickers hardness tester (made by Akashi Corporation). FIG. 7(a) shows a relationship between a distance from a lens center and hardness. In the lateral axis, a and b indicate a radius of the lens effective diameter A and a radius of the resin layer outside diameter B, respectively. An area from the lens center to a has hardness of 10 Hv, which means that the resin is completely cured. In contrast, an area from a to b has hardness of 10-6 Hv, which means that the area is an incompletely cured resin layer with hardness of approximately 100-60% of a completely cured resin layer. Therefore, the polymerization degree of the incompletely cured resin layer is 100-60%.

COMPARATIVE EXAMPLE 1

As in example 1, a commercially available glass material BK-7 was ground to manufacture a glass base material in the form of a planoconvex lens with a diameter of 10 mm and F=30 mm. The organic-inorganic complex solution was applied on the glass base material so as not to contain bubbles. Thereafter, a mold having a surface nickel-plated was pressed thereto, and ultraviolet rays with a central wavelength of approximately 365 nm were uniformly irradiated for ten minutes toward a plane side of the glass base material at an intensity of 1 mW/cm². The organic-inorganic complex solution was thereby cured to form a resin layer. Next, the mold was removed to complete a composite lens. The resin layer formed has a thickness of approximately 100 µm.

Hardness of the resin layer formed was measured (100 gf load, 20 seconds holding) using a Vickers hardness tester (made by Akashi Corporation). FIG. 7(b) shows a relationship between a distance from a lens center and hardness. In the lateral axis, a and b indicate a radius of the lens effective diameter A and a radius of the resin layer outside diameter B, respectively. An area from the lens center to b has hardness of 10 Hv, which means that the resin is completely cured in the whole surface. Therefore, the polymerization degree of the resin layer is 100%.

COMPARATIVE EXAMPLE 2

Figure 6:
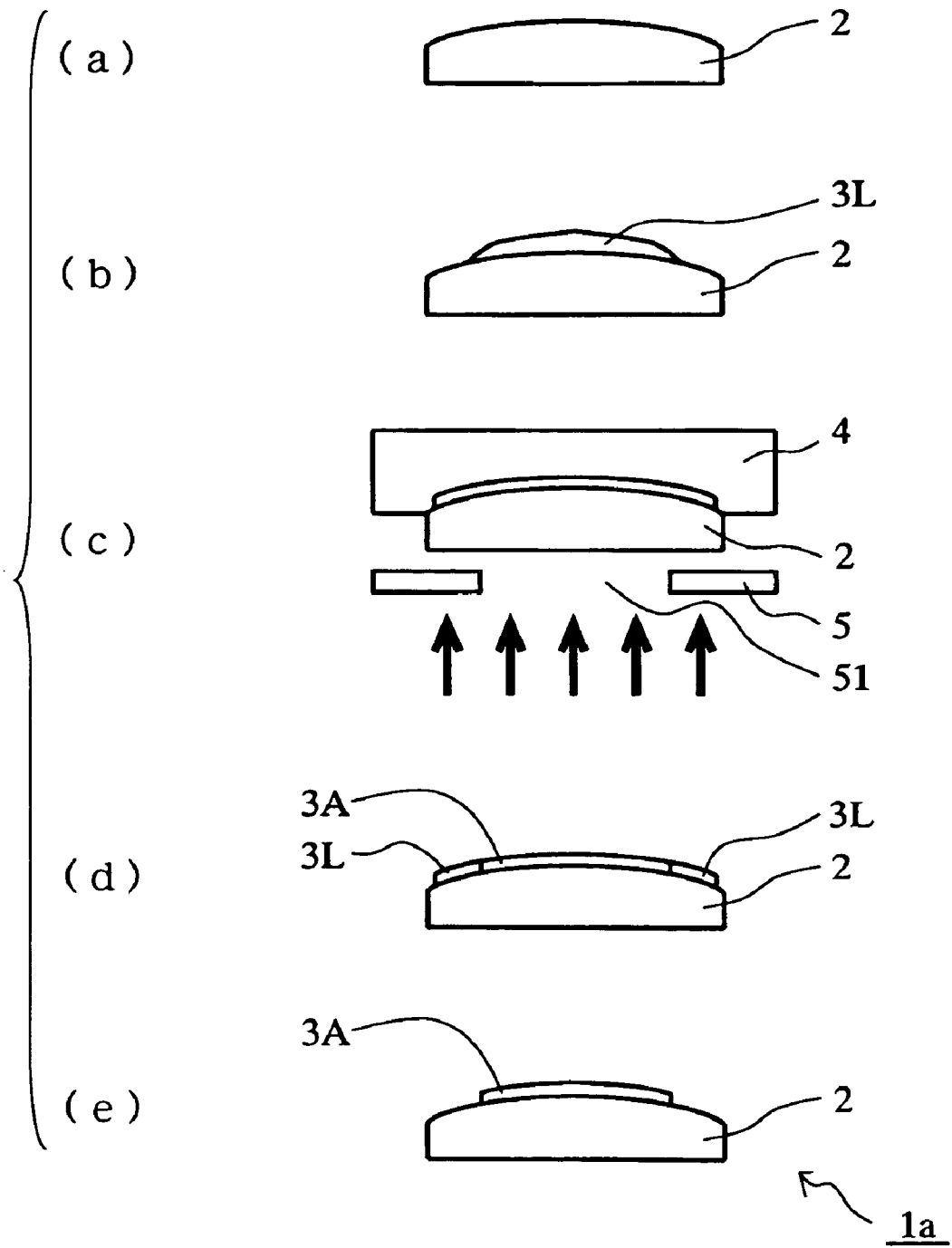
FIG. 6 is a process drawing illustrating a process for manufacturing a composite lens of comparative example 2.

FIG. 6 includes a series of sectional views illustrating a process for manufacturing a composite lens 1a of comparative example 2. As in example 1, a commercially available glass material BK-7 was ground to manufacture, as shown in FIG. 6(a), a glass base material 2 in the form of a planoconvex lens with a diameter of 10 mm and F=30 mm. As shown in FIG. 6(b), the organic-inorganic complex solution 3L was applied on the glass base material 2 so as not to contain bubbles. Thereafter, as shown in FIG. 6(c), a mold 4 having a surface nickel-plated was pressed thereto with a mask 5 further placed, and ultraviolet rays (indicated by arrows) with a central wavelength of approximately 365 nm were uniformly irradiated for ten minutes toward a plane side of the glass base material 2 at an intensity of 1 mW/cm². The organic-inorganic complex solution was thereby cured to form a resin layer. The mask 5 has an opening 51 with an approximately same diameter as of the lens effective diameter A, and allows irradiating ultraviolet rays on the organic-inorganic complex solution only in an inner area of the lens effective diameter A. Next, the mold 4 was removed, and thereafter the uncured organic-inorganic complex solution 3L outside the lens effective diameter A was eliminated by washing with ethanol to complete a composite lens 1a. The resin layer formed has a thickness of approximately 100 µm.

Hardness of the resin layer formed was measured (100 gf load, 20 seconds holding) using a Vickers hardness tester (made by Akashi Corporation). FIG. 7(c) shows a relationship between a distance from a lens center and hardness. In the lateral axis, a indicates a radius of the lens effective diameter A. An area from the lens center to a has hardness of 10 Hv, which means that the resin, which exists only within the lens effective diameter A, is completely cured in the whole surface. Therefore, the polymerization degree of the resin layer is 100%.

(Heat Cycle Characteristics)

A heat cycle test of 85° C. (30 minutes holding), −40° C. (30 minutes holding), and 500 cycles was conducted for samples of example 1 and comparative example 1. As a result, seven samples among ten samples produced cracks in comparative example 1. However, none of ten samples produced cracks or separation in example 1. This shows that provision of an incompletely cured resin layer on an outer periphery of a lens can reduce stress and prevent occurrence of cracks or separation.

Although an outside of the lens effective diameter A has a polymerization degree of 60 to 100% in example 1, a polymerization degree of 60 to 90% can of course further improve prevention effect of cracks or separation.

(Measurement of Adhesive Force)

A tension test was conducted for a resin layer against a glass base material in samples of example 1 and comparative examples 1 and 2. As a result, adhesive force between the resin layer and the glass base material is 15 kgf in example 1, 15 kgf in comparative example 1, and 11 kgf in comparative example 2. The fact that the adhesive force is 15 kgf both in example 1 and comparative example 1 shows that even if an outside of a lens effective diameter is an incompletely cured resin layer as in example 1, there is equivalent adhesiveness to that in the case where the whole resin is a completely cured resin layer as in comparative example 1. It is also shown that the adhesive force is small in comparative example 2 because there is no resin in the area outside the lens effective diameter and a small contact area between the glass base material and the resin layer.

Therefore, the composite lens of example 1 can be considered to be a composite lens in which heat cycle characteristics, namely, reliability can be improved without lowering the adhesive force.

Example 1 describes a composite lens provided with a resin layer having a thickness of 100 μm, but a thickness, a shape, etc. of the resin layer is not limited to this. There can of course be the same effect also, for example, in a composite lens with a resin layer having a smaller thickness in a lens outer periphery than in a lens center, and in contrast, a composite lens with a resin layer having a larger thickness in a lens outer periphery than in a lens center.

Furthermore, in example 1, the organic-inorganic complex solution was cured with ultraviolet rays that had penetrated the glass base material by irradiating ultraviolet rays toward the plane side of the glass base material, but ultraviolet irradiation is not limited to this method. If a mold is manufactured with an ultraviolet transmissive material such as quartz, for example, the organic-inorganic complex solution can be cured with ultraviolet rays that have penetrated the mold by irradiating ultraviolet rays toward this mold.

A detailed description is not given, but a composite lens of example 1 can be used as an aspherical lens, a fresnel lens, an achromatic lens, or a diffraction grating, in a lens module such as, for example, an optical pick-up and a camera module for portable telephones.

What is claimed is:

1. A composite lens comprising a resin layer made from a resin to be polymerized by ultraviolet rays and provided on at least a part of a surface of a base material, the resin layer including a completely cured resin layer and an incompletely cured resin layer, the resin layers being formed in different areas on the surface of said base material.

2. The composite lens according to claim 1, wherein the incompletely cured resin layer is formed outside a lens effective diameter.

3. The composite lens according to claim 1, wherein the incompletely cured resin layer has a polymerization degree of 60 to 90%.

4. The composite lens according to claim 1, wherein the resin varies in refractive index or in transmittance of visible light depending on the polymerization degree.

5. The composite lens according to claim 1, wherein the resin layer is formed from an organic-inorganic complex.

6. The composite lens according to claim 5, wherein the organic-inorganic complex is formed from an organic polymer and a metal alkoxide.

7. The composite lens according to claim 5, wherein the organic-inorganic complex is formed from at least one metal alkoxide.

8. The composite lens according to claim 1, wherein the base material is glass.

9. A manufacturing method for a composite lens comprising the steps of applying a resin liquid to a base material, pressing a mold against the base material and the resin liquid, and forming a completely cured resin layer and an incompletely cured resin layer in different areas on the surface of said base material by irradiating ultraviolet rays having an uneven intensity distribution and terminating irradiation of the ultraviolet rays before the resin liquid is completely cured.

10. The method according to claim 9, wherein the base material is glass.

11. A lens module comprising a composite lens used as a medium for collecting visible light, the composite lens having a resin layer made from a resin to be polymerized by ultraviolet rays provided on at least a part of a surface of a base material, the resin layer including a completely cured resin layer and an incompletely cured resin layer.

12. The lens module according to claim 11, wherein the base material is glass.

* * * * *